United States Patent
Pust et al.

(10) Patent No.: US 7,573,682 B2
(45) Date of Patent: Aug. 11, 2009

(54) WRITER HEATER FOR THERMAL PROTRUSION SHAPE CONTROL IN A MAGNETIC WRITER

(75) Inventors: Ladislav R. Pust, Savage, MN (US); Michael T. Johnson, Minneapolis, MN (US); Richard P. Larson, Brooklyn Park, MN (US); Thu-Van T. Nguyen, Shakopee, MN (US); David C. Seets, Shorewood, MN (US); William P. Vavra, Maple Plain, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 420 days.

(21) Appl. No.: 11/154,223

(22) Filed: Jun. 16, 2005

(65) Prior Publication Data

US 2006/0285248 A1    Dec. 21, 2006

(51) Int. Cl.
*G11B 5/56* (2006.01)

(52) U.S. Cl. .............................. 360/294.7; 360/125.31; 360/125.74; 360/128

(58) Field of Classification Search ............. 360/294.7, 360/128, 125.31, 125.74
See application file for complete search history.

(56) References Cited

U.S. PATENT DOCUMENTS

| 7,133,254 B2 * | 11/2006 | Hamann et al. ............. 360/126 |
| 2005/0018347 A1 * | 1/2005 | Hsiao et al. ................. 360/128 |

* cited by examiner

*Primary Examiner*—A. J. Heinz
(74) *Attorney, Agent, or Firm*—Kinney & Lange, P.A.

(57) ABSTRACT

A transducing device having a storage interface surface includes a writer having a pole tip region, a coil having a width positioned around the writer, and a heating element. The heating element extends to near the storage interface surface. A portion of the heating element is at least as wide as the coil. The heating element heats the writer in response to current flow through the heating element.

16 Claims, 6 Drawing Sheets

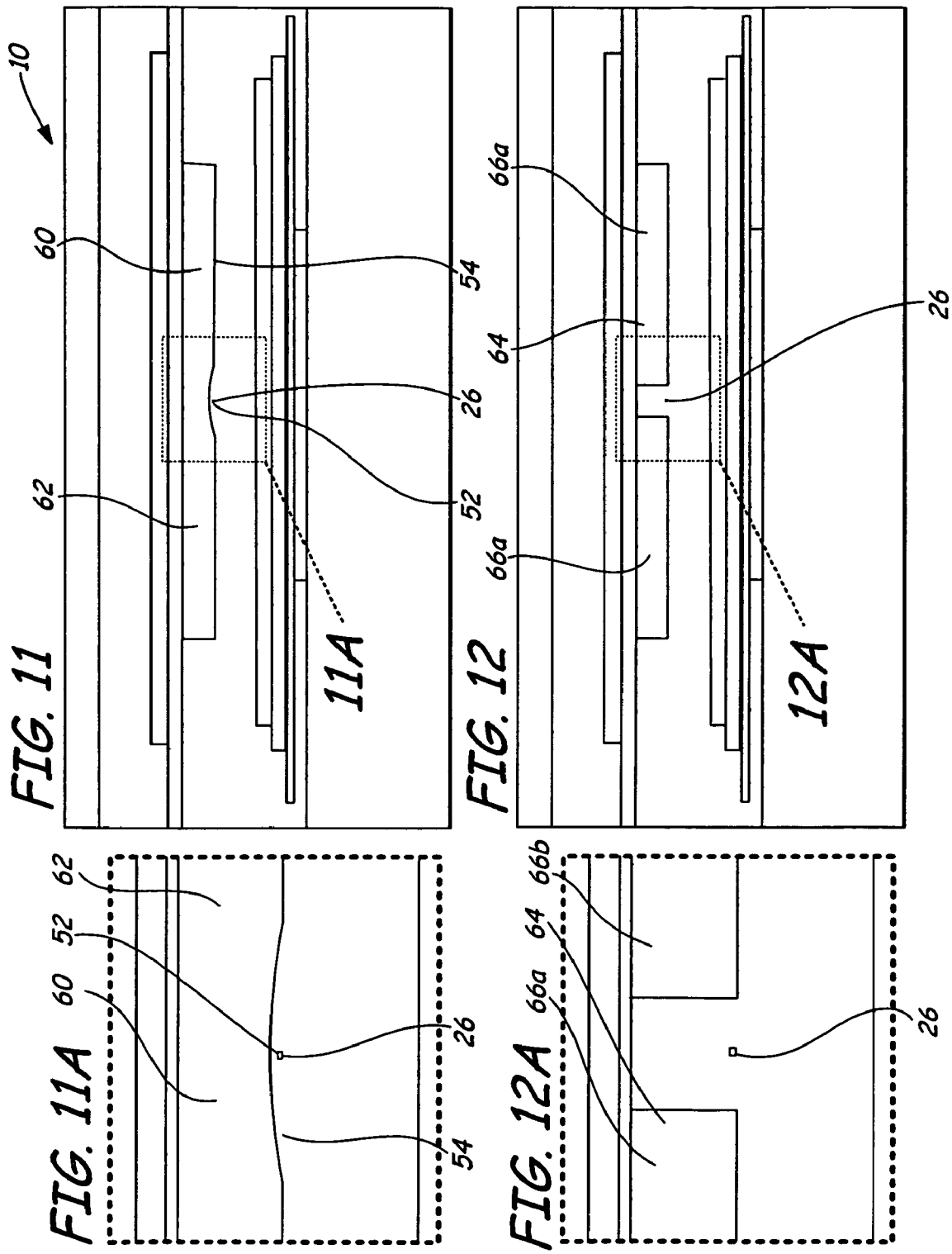

WRITER HEATER FOR THERMAL PROTRUSION SHAPE CONTROL IN A MAGNETIC WRITER

BACKGROUND OF THE INVENTION

The present invention relates generally to a transducing device that includes a heater. In particular, the present invention relates to a magnetic head having a wide head-to-media contact surface.

In a magnetic data storage and retrieval system, a magnetic head typically includes a writer portion for storing magnetically-encoded information on a magnetic media and a reader portion for retrieving the magnetically-encoded information from the magnetic media. To write data to the magnetic media, an electrical current is caused to flow through a conductive coil to induce a magnetic field in a write pole. By reversing the direction of the current through the coil, the polarity of the data written to the magnetic media is also reversed.

During operation of the magnetic data storage and retrieval system, the magnetic head is positioned in close proximity to the magnetic media. The distance between the magnetic head and the media is preferably small enough to allow for writing to and reading from the magnetic media with a large areal density, and great enough to prevent contact between the magnetic media and the magnetic head. Performance of the magnetic head depends primarily upon head-media spacing (HMS). High density recording preferably requires a small HMS and a low fly height. Prior to using each magnetic head, there are small variations in fly height that must be accounted for due to changing operating conditions and head-to-head variations.

Current magnetic head designs use a heater to heat the magnetic head and reduce the HMS by controlled thermal expansion of the magnetic head. The heater is typically placed close to, or even inside, the writer coil to maximize heating of the writer. For effective operation, the heater must provide a large enough heater stroke when the write pole is either close to the magnetic media or only slightly recessed from the point at the storage interface surface where the writer protrudes most. In addition, the fly clearance must be measured for each magnetic head by a controlled measurable non-destructive head-media contact so that the proper algorithm for operating the heater is used for each magnetic head.

The head-media contact is typically detected by a signal that changes sharply when the head mechanically contacts a lube layer of the magnetic media. For example, the signal could be $\Delta PES$ (position error signal). To use $\Delta PES$, the surface area of the head-media contact must be large enough so that when the thermally protruded magnetic head hits the lube layer of the magnetic media, the magnetic head component protruding most at the storage interface surface does not penetrate past the lube layer and start burnishing on the hard media surface, destroying the protective magnetic head layer.

In addition to the shape of the thermal protrusion produced by the heater, the storage interface surface topology can also largely impact the ability to detect contact between the magnetic head and the lube layer. In particular, if the write pole is positioned far away from the other metallic components of the head at the storage interface surface and protrudes above the surrounding alumina at a distance either comparable to, or greater than, the thickness of the lube layer, then the write pole can penetrate through the lube layer and burnish before a large enough head-media contact between the magnetic head and the lube layer is generated to be detectable.

BRIEF SUMMARY OF THE INVENTION

In one aspect, the invention is a transducing device having a storage interface surface, a writer having a tip region, a coil having a width positioned around the writer, and a heater. The heater extends to near the storage interface surface. A portion of the heater is at least as wide as the coil.

In another aspect, the invention is a heater for heating a magnetic writer having a storage interface surface, a pole tip region, and a coil positioned around the writer. The heater includes a first heating element and a second heating element. The first heating element extends to near the storage interface surface adjacent first and second sides of the coil. The second heating element is positioned behind the first heating element.

In another aspect, the invention is a writer having a storage interface surface, a pole tip region, and a heating element. The heating element extends to the storage interface surface and is shaped adjacent the storage interface surface to produce a substantially uniform protruded head-media contact surface by thermal protrusion.

BRIEF DESCRIPTION OF THE DRAWINGS

FIG. 11 is a storage interface surface view of a first embodiment of the contact pad of the magnetic head in accord with the present invention.

FIG. 11A is an enlarged view of region 11A of FIG. 11.

FIG. 12 is a storage interface surface view of a second embodiment of the contact pad of the magnetic head in accord with the present invention.

FIG. 12A is an enlarged view of region 12A of FIG. 12.

DETAILED DESCRIPTION

Figure 1:
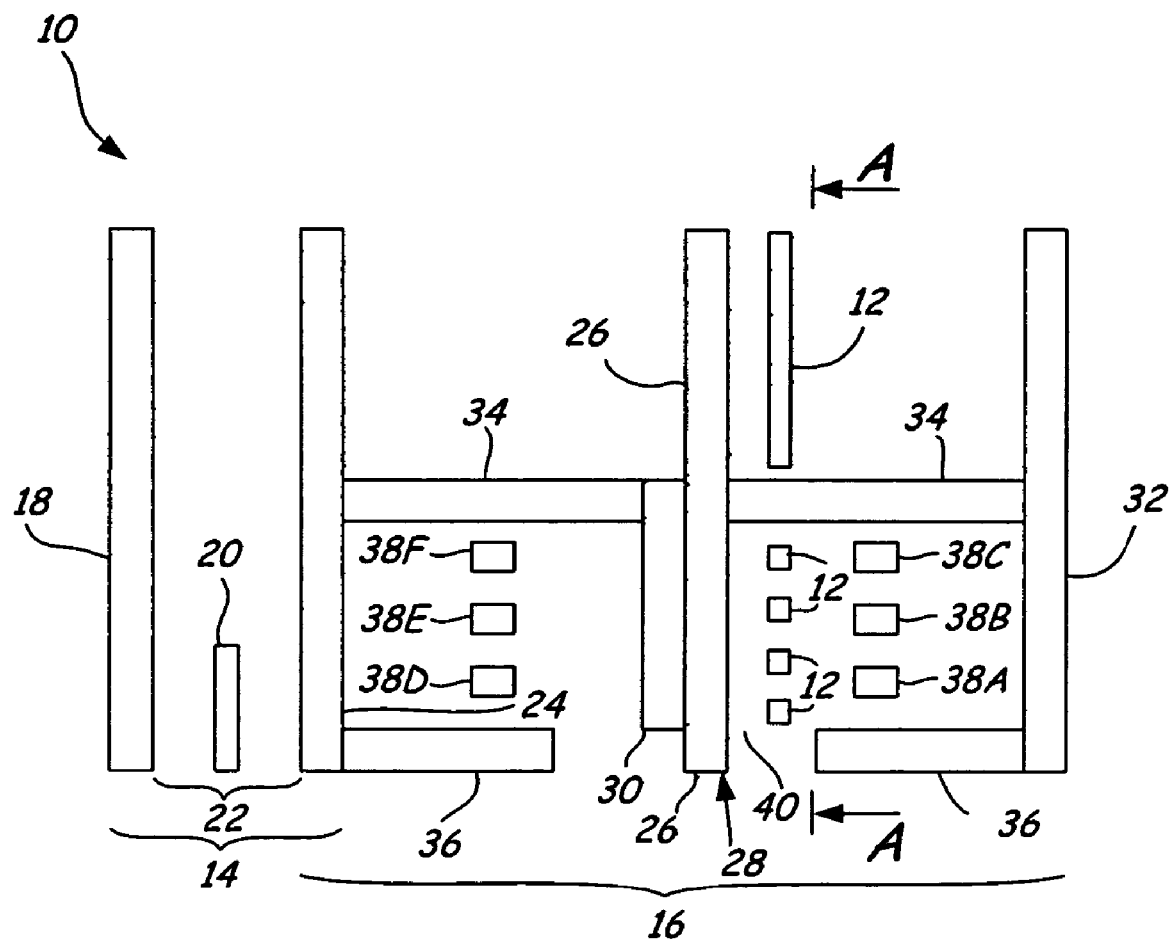
FIG. 1 is a sectional view of a magnetic head in accord with the present invention having a heating element.

FIG. 1 is a sectional view of magnetic head 10 having heater 12 in accord with the present invention. Magnetic head 10 generally comprises reader 14 and writer 16, shown in FIG. 1 in a merged configuration. Reader 14 includes bottom shield 18, read element 20, read gap 22, and shared pole 24

(which acts as both a top shield and a return pole). Bottom shield 18 is spaced from shared pole 24 by read gap 22. Bottom shield 18 and shared pole 24 are formed from metallic materials (preferably from an alloy composed primarily of Fe, Ni, and/or Co) that typically have a large CTE. For example, a composition with about 80% Ni-20% Fe or 79% Ni-21% Fe has a CTE in the range of about $10.0 \times 10^{-6}/°$ C. to $13.0 \times 10^{-6}/°$ C.

Read element 20 is positioned in read gap 22 between bottom shield 18 and shared pole 24 adjacent a storage interface surface of magnetic head 10. Because the present invention is applicable to industries other than the disc drive industry (i.e. biomedical and automotive), the storage interface surface is generally defined as the surface of the magnetic sensor that interacts with the medium that is able to store data. For instance, an example of a medium in the biomedical industry can include the human body. Read gap 22 is defined on the storage interface surface between terminating ends of bottom shield 18 and shared pole 24 and serves to insulate read element 20 from both bottom shield 18 and shared pole 24. In operation, magnetic flux from a surface of a magnetic media causes rotation of a magnetization vector of read element 20, which in turn causes a change in electrical resistivity of read element 20. The change in resistivity of read element 20 can be detected by passing a current through read element 20 and measuring a voltage across read element 20. Other magnetic sensing technologies may also be used in the read element. Read element 20 can be any type of read element, such as an anisotropic magnetoresistive (AMR) read element, a giant magnetoresistive (GMR) read element, or a tunneling giant magnetoresistive (TGMR) read element. Read gap 22 is generally formed of an insulating material, such as $Al_2O_3$.

Writer 16 includes heater 12, shared pole 24, write pole 26, write pole tip 28 located at an end of write pole 26 at the storage interface surface, yoke 30, return pole 32, back via 34, front shields 36, write coil 38 (shown as upper coil turns 38A, 38B, and 38C and lower coil turns 38D, 38E, and 38F), and insulator 40. Although magnetic head 10 is shown having two return poles (i.e. shared pole 24 and return pole 32), writer 16 may have only one return pole or no return pole without departing from the intended scope of the invention. Shared pole 24, write pole 26, and return pole 32 extend from the storage interface surface and are connected to each other distal from the storage interface surface by back via 34. Yoke 30 is formed on write pole 26 and is also connected to back via 34, but does not extend the full length of write pole 26. Front shields 36 are connected to shared pole 24 and return pole 32 adjacent the storage interface surface and extend toward write pole tip 28. Front shields 36 can be eliminated from writer 16 without departing from the intended scope of the invention. Insulator 40 separates shared pole 24, write pole 26, and return pole 32 from each other and from coil 38.

Shared pole 24, yoke 30, return pole 32, back via 34, and front shields 36 are formed from metallic ferromagnetic materials. Preferably, each of these components is formed from an alloy composed primarily of Fe, Ni, and/or Co which typically has a large CTE.

As shown in FIG. 1, coil 38 has upper coil turns 38A, 38B, and 38C and lower coil turns 38D, 38E, and 38F. Upper coil turns 38A, 38B, and 38C are positioned between write pole 26 and return pole 32, and lower coil turns 38D, 38E, and 38F are positioned between shared pole 24 and write pole 26. Coil turns 38A, 38B, 38C, 38D, 38E, and 38F wrap around write pole 26 such that the flow of electrical current through conductive coil 38 generates a magnetic flux at write pole tip 28. In one configuration, coil 38 may be wrapped in the following order: 38A to 38D to 38B to 38E to 38C to 38F. Although FIG. 1 shows coil 38 to be wrapped in a helical configuration, other configurations can be used without departing from the scope of the intended invention. Each individual coil section 38A, 38B, 38C, 38D, 38E, and 38F is separated from one another and from shared pole 24, write pole 26, return pole 32, and back via 34 by insulator 40. Coil 38 is generally formed from an electrically-conductive metal, such as Cu, Au, or Ag. Most commonly used is Cu, which has a CTE in the range of about $16.0 \times 10^{-6}/°$ C. to $18.0 \times 10^{-6}/°$ C.

Insulator 40 surrounds coil 38 and is preferably formed from a dielectric material with high thermal conductivity to facilitate the removal of heat from coil 38 via shared pole 24, write pole 26, and return pole 32. Insulator 40 is preferably formed from $Al_2O_3$ or a photoresist having a large CTE.

Heater 12 serves to supply localized heat to writer 16 in order to control the shape of thermal protrusion of writer 16 at the storage interface surface. Heater 12 can be placed between write pole 26 and upper coil turns 38A, 38B, and 38C, between write pole 26 and lower coil turns 38D, 38E, and 38F, between upper coil turns 38A, 38B, and 38C and return pole 32, or between shared pole 24 and lower coil turns 38D, 38E, and 38F. Heater 12 is formed from a highly resistive alloy, preferably an alloy composed primarily of Cr, W, or Ta.

Although FIG. 1 illustrates magnetic head 10 having a perpendicular writer and this specification discusses the invention primarily with respect to a perpendicular writer, the present invention may be used in both a perpendicular writer and a longitudinal writer. In cases involving a longitudinal writer, the write pole is replaced with a top pole. In addition, shared pole 24 can also include multiple layers, including a top shield, a non-magnetic layer, and a bottom pole. The present invention may also be used in a writer which comprises a write pole without a full magnetic yoke.

Figure 2:
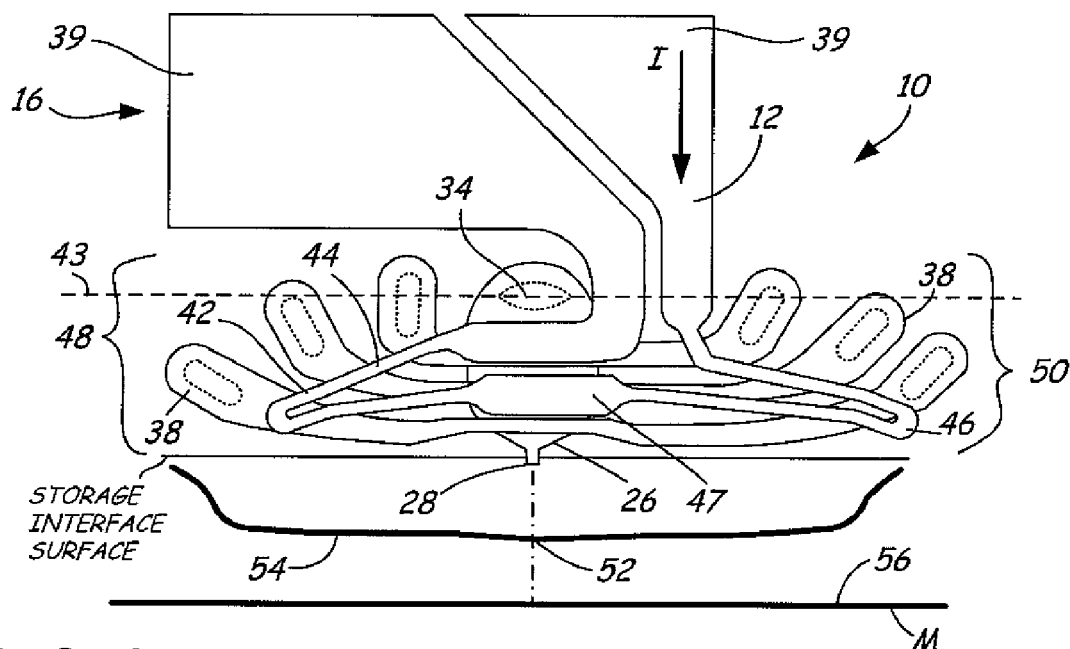
FIG. 2 is a top view of a first embodiment of the magnetic head in accord with the present invention as taken along lines A-A of FIG. 1.

FIG. 2 is a top view of a first embodiment of magnetic head 10 of the present invention as taken along line A-A of FIG. 1 with insulator 40 removed. FIG. 2 shows heater 12, write pole 26, write pole tip 28, back via 34, coil 38 wrapped around write pole 26, and heater leads 39. In the first embodiment, heater 12 is comprised of first heating element 42, which is the structure that falls below line 43 having heating conductors 44 and heater turns 46 extending through writer 16. Heating conductors 44 have a greater conductor width proximate pole tip 28 as shown at location 47 than proximate coil 38 as shown at heater turns 46. The purpose of first heating element 42 is to generate a protrusion at the storage interface surface that is uniformly wide along the trailing edge direction near first side 48 and second side 50 of coil 38, while generating much less protrusion at the AlTiC edge around write pole tip 28. The thermal protrusion is necessary to ensure that when the fly height of writer 16 is being adjusted in relation to magnetic media M, write pole 26 is protected from burnishing.

Due to internal heating and the resulting thermal expansion of metallic components in writer 16, write pole 26 is typically the component of writer 16 that protrudes the most at the storage interface surface. Thus, write pole 26 is commonly either used as head-media contact 52 or is positioned close to head-media contact 52. Head-media contact 52 is the first contact point between magnetic head 10 and magnetic media M. The localized heating of writer 16 by heater 12 creates controlled thermal protrusion at the storage interface surface around write pole 26 in order to protect write pole 26. The thermal protrusion is shaped to create a head-media contact surface 54 that is wide enough along the storage interface surface to ensure that writer 16 detects magnetic media M before head-media contact 52 penetrates through lube layer 56 of magnetic media M onto the hard media surface and destroys write pole 26 or another component of writer 16. One example of a method of detecting contact between a head and media is detection of a sharp increase of ΔPES (delta position error signal). When a head at skew contacts a lubricant layer on the media, it is dragged off-track more than when only flying. To compensate for this off track drag force, larger ΔPES is generated by a positioning system to keep the head on track on media.

Voltage applied to first heating element 42 causes current I to flow through heater leads 39 of heater 12. In turn, the heat generated from current I passing through heating conductors 44 of first heating element 42 provides localized heating in writer 16. The level of heat emitted from any portion of first heating element 42 is dependent on the resistance through heating conductors 44 and can be controlled by optimizing the configuration, shape, and ratio of heating conductors 44 and heater turns 46. Heating conductors 44 of first heating element 42 are positioned with at least a portion of first heating element 42 extending across writer 16 from first side of coil 48 to second side of coil 50. Heating conductors 44 and heater turns 46 of first heating element 42 are configured such that current I passing through first heating element 42 generates more heat close to the storage interface surface, where cooling occurs at a rapid rate, and generates less heat further away from the storage interface surface, where cooling occurs at a slow rate. This configuration of heating conductors 44 provides heated volume with more uniform protrusion at the storage interface surface. In general, when heating conductors 44 have multiple heater turns 46 positioned close to one another, first heating element 42 emits a greater amount of heat because current I must pass around heater turns 46. By contrast, if heating conductors 44 are linear, current I flows straight through first heating element 42 without a significant build-up of heat.

In order to control the amount of heat emitted from first heating element 42 at a particular location, heating conductors 44 of first heating element 42 also have varying conductor widths, which is the width of heating conductors 44. In general, as heating conductors 44 decrease in conductor width, more heat is emitted due to the increased resistance. Heating conductors 44 are wider adjacent write pole 26 with a conductor width $W_P$, and narrower adjacent coil 38 with a conductor width $W_C$. This configuration generates more heat proximate coil 38 where the electrical resistance is higher, and generates less heat near write pole 26 where the electrical resistance is lower. As a result, a desired wide, flat-shaped thermal protrusion at the storage interface surface is achieved. Even though less heat is generated by first heating element 42 at write pole 26 than at coil 38, writer 16 at write pole 26 still protrudes toward the storage interface surface at a distance equal to the protrusion produced at coil 38 due to heating around write pole 26 from other sources. The heat from wide heating conductors 44 adjacent coil 38 produces the same amount of thermal protrusion at the storage interface surface as the combined heat from narrow heating conductors 44 and other sources adjacent write pole 26. Thus, the resulting thermal protrusion at the storage interface surface has a flat shape extending from first side of coil 48, across pole tip region 28, to second side of coil 50. Heating conductors 44 of first heating element 42 are also wider over the edges of write pole 26 to improve electrical reliability and robustness. In one embodiment, the ratio of conductor width $W_P$ of heating conductors 44 at write pole 26 and conductor width $W_C$ of heating conductors 44 at coil 38 is between 1:1.5 and 1:8.

Figure 3:
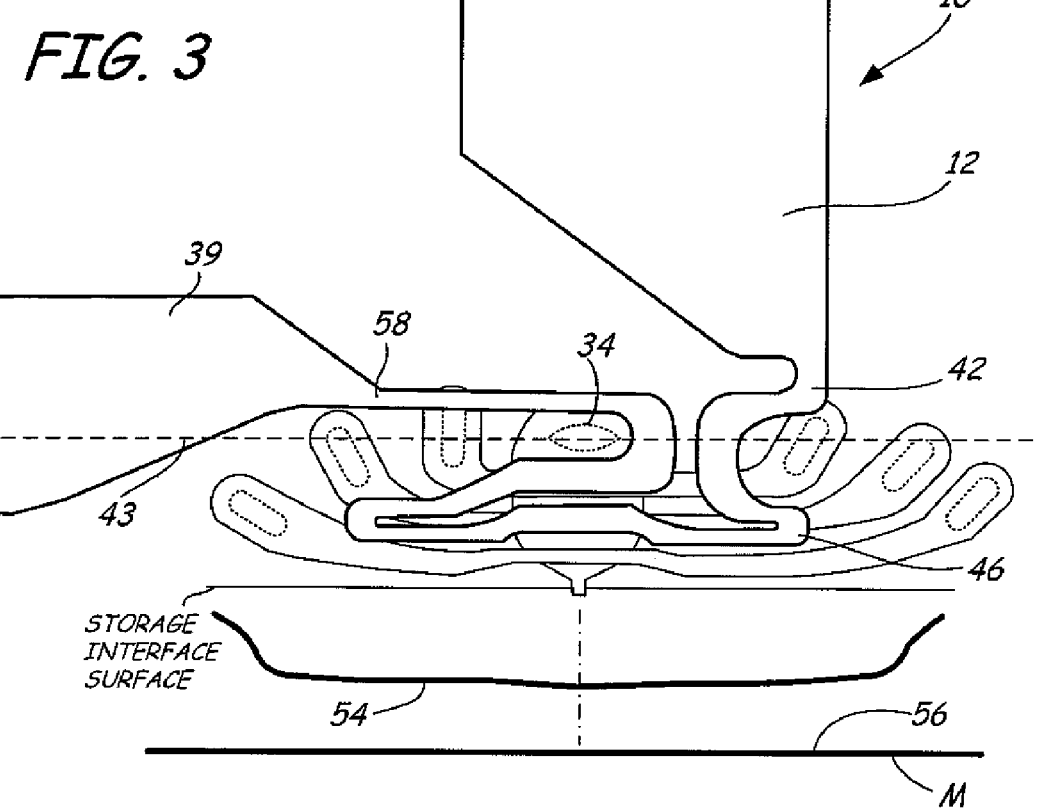
FIG. 3 is a top view of a second embodiment of the magnetic head in accord with the present invention as taken along lines A-A of FIG. 1.

FIG. 3 is a top view of a second embodiment of magnetic head 10. In the second embodiment, first heating element 42 and second heating element 58 form heater 12. Second heating element 58 is positioned behind back via 34 and is connected between heater leads 39 and first heating element 42. The purpose of second heating element 58 is to provide an additional heat source behind coil 38 in order to controllably increase head-media contact surface 54, even though it generates much less heat than first heating element 42. As second heating element 58 heats the area above write pole 26 and behind back via 34, head-media contact surface 54 increases to provide an increasing flat thermal protrusion of writer 16 and head-media contact surface 54.

Figure 4:
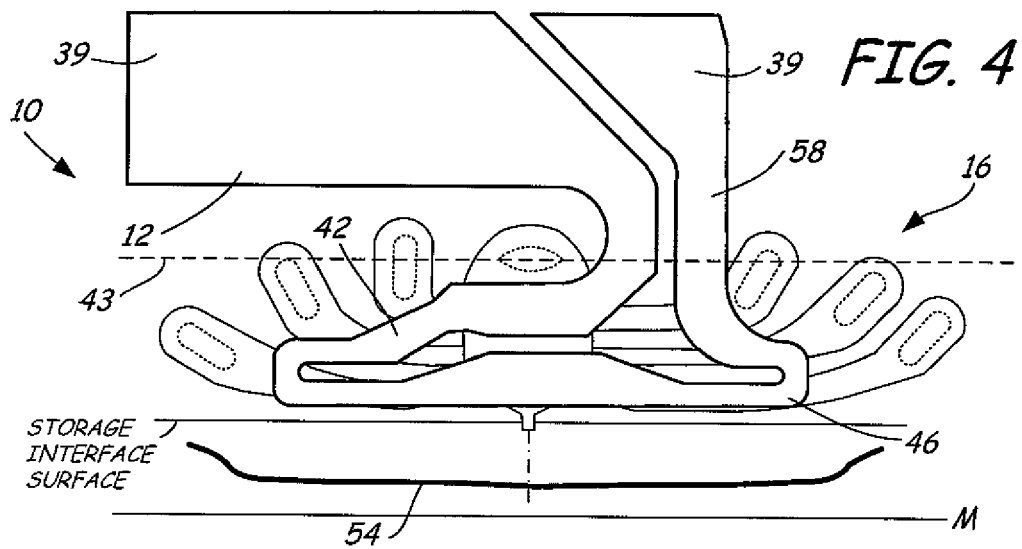
FIG. 4 is a top view of the magnetic head in accord with the present invention having 0% of its total heat generated from a second heating element.
Figure 5:
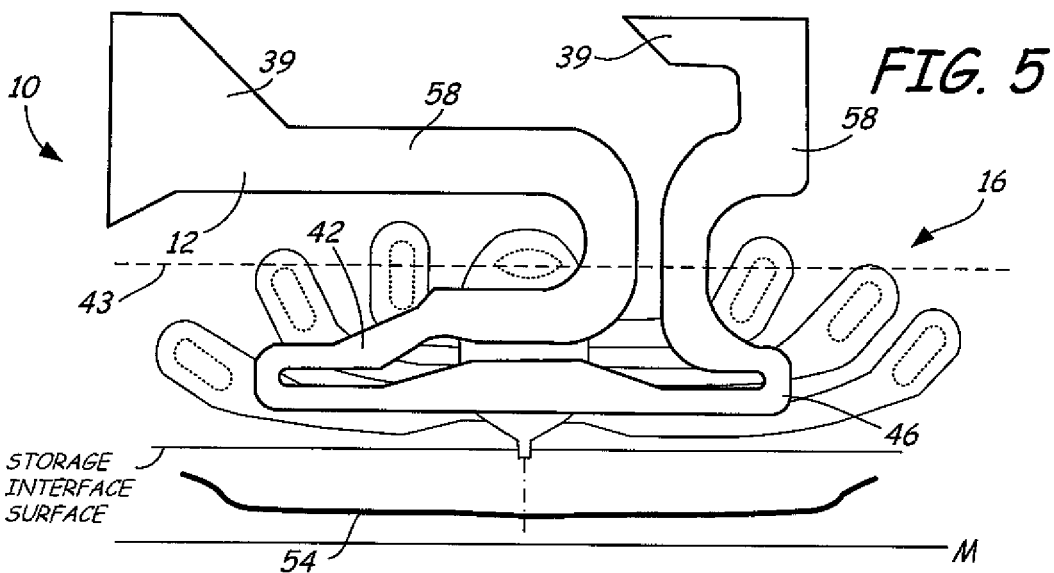
FIG. 5 is a top view of a the magnetic head in accord with the present invention having 15% of its total heat generated from the second heating element.
Figure 6:
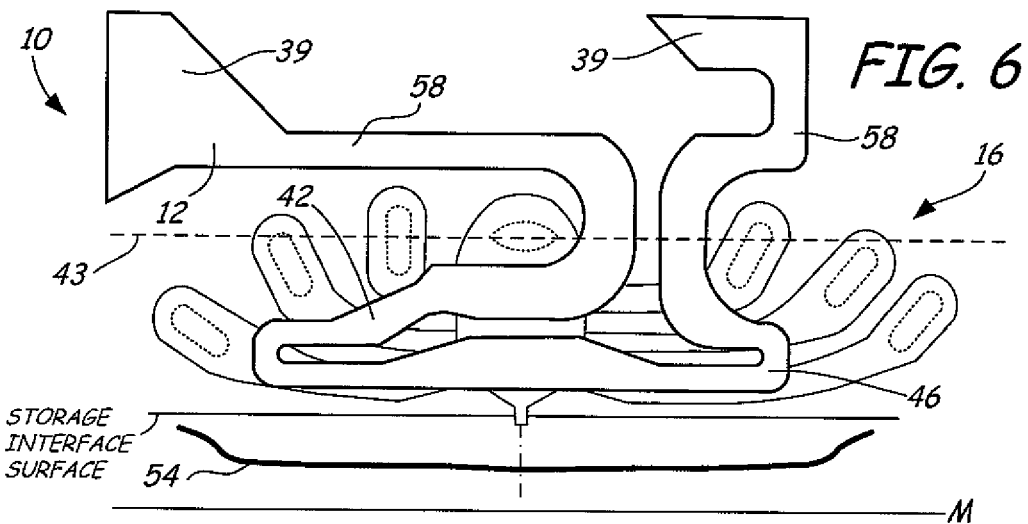
FIG. 6 is a top view of the magnetic head in accord with the present invention having 25% of its total heat generated from the second heating element.

To better illustrate the effect of second heating element 58 on the thermal protrusion of writer 16, FIGS. 4-6 show top views of magnetic head 10 having 0%, 15%, and 25% of the total heat in writer 16 generated by second heating element 58, respectively, and the resulting thermal protrusion. As can be seen in FIGS. 4-6, the resulting thermal protrusion of magnetic head 10 is substantially the same parallel to the plane of the paper. However, as more of the total heat is generated from second heating element 58, the thermal protrusion of magnetic head 10 widens perpendicular to the plane of the paper.

FIG. 4 shows magnetic head 10 having 0% of its total heat generated from second heating element 58 and 100% of its total heat generated from first heating element 42. Because second heating element 58 is not generating any heat, only heat from first heating element 42 pushes head-media contact surface 54 of writer 16 toward magnetic media M. When 100% of the heat from heater 12 is from first heating element 42, there is no substantial head-media contact surface 54, and the shape of the thermal protrusion perpendicular to the plane of the paper is long and narrow.

FIG. 5 is a top view of magnetic head 10 having approximately 15% of its total heat generated from second heating element 58 and approximately 85% of its total heat generated from first heating element 42. As can be seen in FIG. 5, when heater 12 comprises both first heating element 42 and second heating element 58, head-media contact surface 54 and the thermal protrusion perpendicular to the plane of the paper becomes wider.

FIG. 6 is a top view of magnetic head 10 having approximately 25% of its total heat generated from second heating element 58 and approximately 75% of its total heat generated from first heating element 42. As can be seen in FIG. 6, as the amount of heat flowing through second heating element 58 increases, head-media contact surface 54 becomes wider along the length of writer 16. Head-media contact surface 54 widens such that the thermal protrusion of writer 16 at the storage interface surface extends closer to first and second sides of coil 48 and 50. The thermal protrusion of writer 16 perpendicular to the plane of the paper also continues to widen when more heat is generated by second heating element 58.

Figure 7:
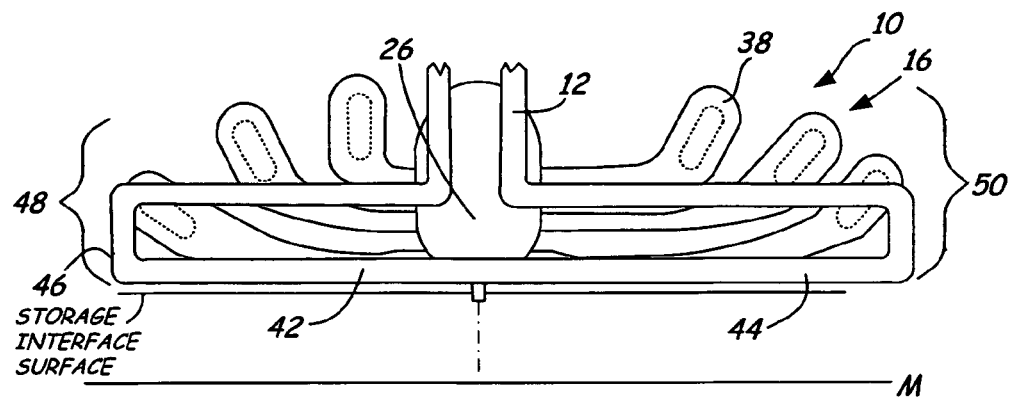
FIG. 7 is a top view of a third embodiment of the magnetic head in accord with the present invention as taken along lines A-A of FIG. 1.
Figure 8:
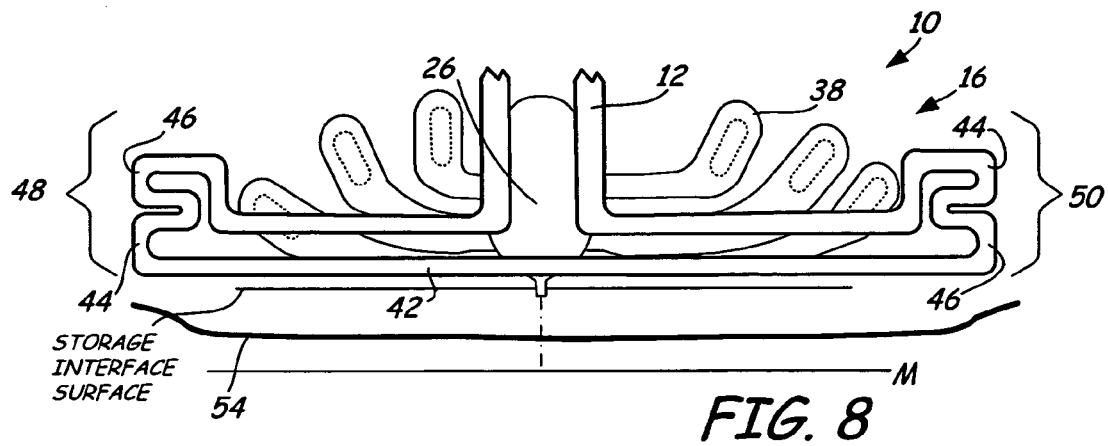
FIG. 8 is a top view of a fourth embodiment of the magnetic head in accord with the present invention as taken along lines A-A of FIG. 1.
Figure 9:
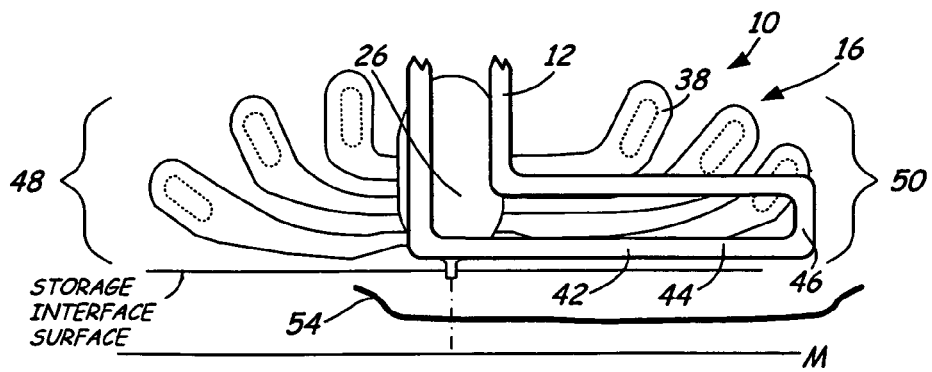
FIG. 9 is a top view of a fifth embodiment of the magnetic head in accord with the present invention as taken along lines A-A of FIG. 1.

FIGS. 7-9 are top views of a third, fourth, and fifth embodiment of heater 12 of magnetic head 10 as taken along lines A-A of FIG. 1, respectively. In FIGS. 7-9, writer 16 includes write pole 26, but does not include magnetic yoke 30 as shown in FIG. 1. Because writer 16 does not have a back via, heating conductors 44 of first heating element 42 can be symmetric. In the third embodiment of heater 12 (FIG. 7), magnetic head 10 has enhanced heating achieved by extending first heating element 42 past coil 38.

FIG. 8 depicts the fourth embodiment of magnetic head 10. Extra-wide thermal protrusion is achieved around write pole 26 at the storage interface surface by extending first heating element 42 past coil 38 and placing additional heater turns 46 past first and second sides of coil 48 and 50. With additional heater turns 46, more localized heat is provided at first and second sides 48 and 50, causing a wider and more flat protrusion of head-media surface 54.

FIG. 9 depicts the fifth embodiment of magnetic head 10 with first heating element 42 extending only to second side 50 of coil 38, rather than extending to both first and second sides 48 and 50 of coil 38. In some circumstances, it is beneficial to intentionally make heating conductors 44 of first heating element 42 asymmetric in order to create an asymmetric thermal protrusion at the storage interface surface. An asymmetric protrusion at the storage interface surface can exert more torque on the slider when magnetic head 10 contacts media M and improve ΔPES. Additionally, an asymmetric protrusion can also assist in contact testing at zero skew.

Figure 10:
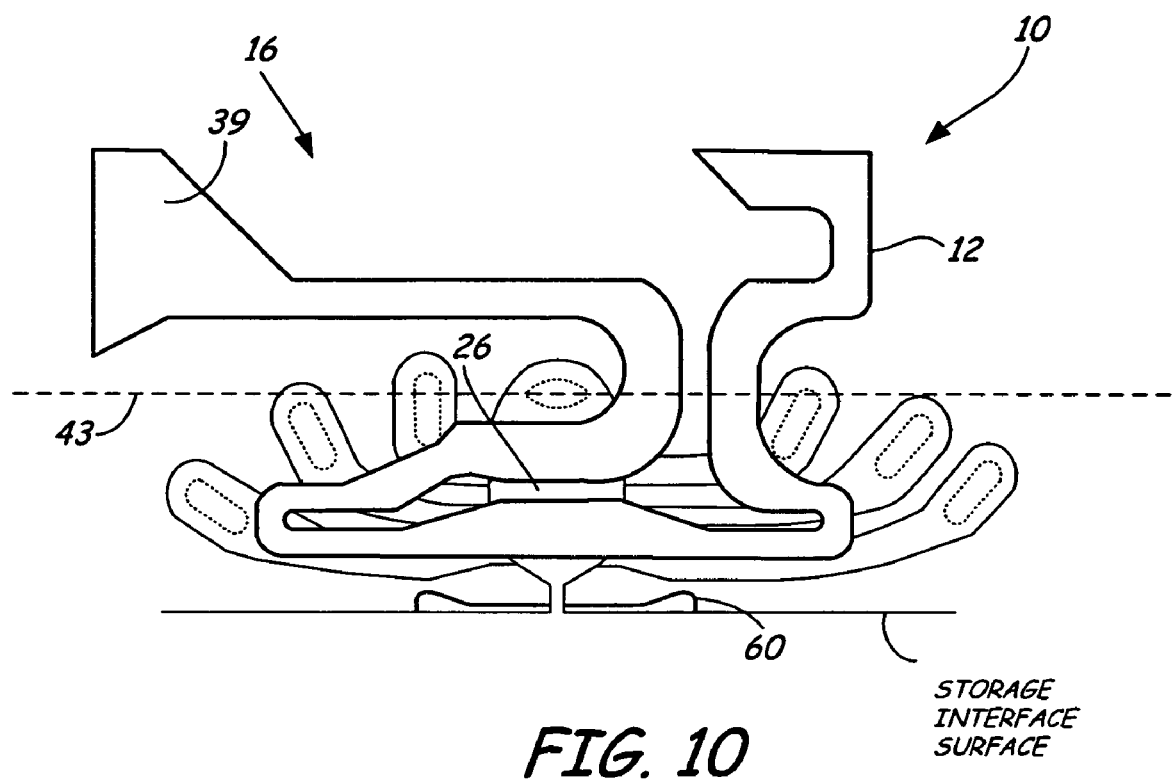
FIG. 10 is a top view of the magnetic head in accord with the present invention having a contact pad.

FIG. 10 is a top view of magnetic head 10 having contact pad 60. In order to create an even wider head-media contact surface around write pole 26, contact pad 60 is positioned in close proximity to write pole 26. Contact pad 60 may be formed by building additional larger metallic components at the storage interface surface near write pole 26 or by using other functioning components of magnetic head 10. For example, contact pad 60 may be built from shared pole 24, return pole 32, or front shields 36 (shown in FIG. 1). Alternatively, contact pad 60 may be built specifically to provide the needed wide and flat head-media contact surface. Typically, contact pad 60 is built from a material similar to write pole 26 so that it will expand at the same rate as write pole 26.

In many cases, contact pad 60 is needed in addition to a properly designed heater 12 to obtain a head-media contact surface large enough to detect contact between magnetic head 10 and the magnetic media before write pole 26 penetrates the lube layer and the head-media contact is destroyed. As the head-media contact surface increases in width, the chances of write pole 26 dipping past the lube layer onto the hard media surface of the magnetic media and burnishing write pole 26 decreases. Thus, contact pad 60 is needed to provide the extra thermal protrusion around write pole 26.

FIGS. 11 and 11A are enlarged storage interface surface views of magnetic head 10 showing a first embodiment of contact pad 60. In this first embodiment, contact pad 60 is built from a single block 62 positioned above write pole 26. Contact pad 60 also covers a large area on either side of write pole 26 at the storage interface surface. Contact pad 60 increases the thermal protrusion in the areas immediately surrounding write pole 26 such that head-media surface 54 covers a wide area around write pole 26. This wide head-media surface 54 protects write pole 26 when writer 16 contacts magnetic media M.

FIGS. 12 and 12A are enlarged storage interface surface views of a second embodiment of contact pad 64. In the second embodiment, contact pad 64 consists of a pair of blocks 66a and 66b positioned on either side of write pole 26. Blocks 66a and 66b protect write pole 26 when writer 16 contacts magnetic media M by creating a more uniform head-media contact surface 54 at thermally protruded contact pad 64 and write pole 26. In addition, this structure also reduces stray field sensitivity.

The magnetic head of the present invention comprises a heater for controlled thermal expansion of a writer at the storage interface surface. The protrusion created by the heater provides a large head-media contact surface in order to protect the write pole, as well as other components of the writer. The heater is typically comprised of a first heating element and a second heating element, although the second heating element is not necessary in all magnetic heads. The first heating element spans the length of the storage interface surface near the pole tip region and extends to the first and second sides of the coil. The second heating element generates heat behind the via and the coil. Current passing through the heater generates heat at the heating conductors and turns of the first heating element and the second heating element to provide localized heating of the writer.

In addition to the heater, a contact pad may be necessary in order to achieve the desired wide, flat-shape thermal protrusion around the write pole. The write pole is typically used as the head-media contact and needs to be protected from burnishing when it comes into contact with the magnetic media. The contact pad is built around the write pole and helps create a wide, flat-shaped protrusion around the write pole at the storage interface surface. The heater and contact pad of the present invention allow heat to be generated in a controlled manner at the storage interface surface in order to provide a wide head-media contact surface.

Although the present invention has been described with reference to preferred embodiments, workers skilled in the art will recognize that changes may be made in form and detail without departing from the spirit and scope of the invention.

The invention claimed is:

1. A transducing device having a storage interface surface, the transducing device comprising:
    a writer having a tip region;
    a coil positioned around the writer, the coil having a width; and
    a heating element extending between the writer and the coil and having heating conductors extending to proximate the storage interface surface and proximate the coil, wherein the heating conductors have a conductor width proximate the tip region that is greater than a second conductor width of the heating conductors proximate the coil.

2. The device of claim 1, wherein the heating element comprises:
    a first heating element having a first conductor and a second conductor extending to near the storage interface surface at opposite sides of the tip region proximate the coil.

3. The device of claim 2, wherein the first conductor and the second conductor have a plurality of turns and at least one turn is proximate the coil.

4. The device of claim 3, wherein the turns of the first conductor and the second conductor are rounded.

5. The device of claim 3, wherein the first and second conductors have varying conductor widths.

6. The device of claim 5, wherein the first and second conductors have a greater conductor width proximate the tip region and the first and second heating conductors have a smaller conductor width proximate the coil.

7. The device of claim 2, wherein the heating element further comprises:
    a second heating element positioned behind the first heating element with respect to the storage interface surface.

8. The device of claim 1, and further comprising additional metallic components proximate the pole tip region.

9. In a magnetic writer including a storage interface surface, a pole tip region, and a coil positioned around the writer, the coil having a first side and a second side opposite the first side, a heater comprising:
    a first heating element having at least one heating conductor extending to near the storage interface surface adjacent the first and second sides of the coil, wherein a first width of the first heating conductor proximate the pole tip region is greater than a second width of the first heating conductor proximate the coil; and
    a second heating element positioned behind the first heating element with respect to the storage interface surface.

10. The heater of claim 9, wherein the first heating element comprises a plurality of conductors.

11. The heater of claim 10, wherein the plurality of conductors have a plurality of turns.

12. The heater of claim 10, wherein the plurality of conductors have varying conductor widths.

13. The heater of claim 9, and further comprising a contact pad proximate the pole tip region.

14. The heater of claim 13, wherein the contact pad comprises a plurality of metallic components.

15. The heater of claim 13, wherein the contact pad comprises a pair of blocks positioned on either side of the pole tip region.

16. The heater of claim 13, wherein the contact pad comprises a block positioned between the pole tip region and the first heating element.

* * * * *

UNITED STATES PATENT AND TRADEMARK OFFICE
CERTIFICATE OF CORRECTION

PATENT NO. : 7,573,682 B2
APPLICATION NO. : 11/154223
DATED : August 11, 2009
INVENTOR(S) : Pust et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Seventh Day of September, 2010

David J. Kappos
*Director of the United States Patent and Trademark Office*